(12) United States Patent
Klassen et al.

(10) Patent No.: US 6,711,137 B1
(45) Date of Patent: Mar. 23, 2004

(54) SYSTEM AND METHOD FOR ANALYZING AND TUNING A COMMUNICATIONS NETWORK

(75) Inventors: Fredrick K. P. Klassen, Vancouver (CA); Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/267,843

(22) Filed: Mar. 12, 1999

(51) Int. Cl.$^7$ .............................................. H04L 12/26
(52) U.S. Cl. ...................... 370/252; 709/223
(58) Field of Search .............................. 370/230, 230.1, 370/231, 232, 233, 234, 235, 252, 241, 248, 249, 250, 253; 709/207, 223, 224, 225, 237, 238, 240

(56) References Cited

U.S. PATENT DOCUMENTS

| | | | |
|---|---|---|---|
| 5,315,580 A | 5/1994 | Phall | 370/13 |
| 5,381,404 A | 1/1995 | Sugano et al. | 370/13 |
| 5,450,394 A | 9/1995 | Gruber et al. | 370/17 |
| 5,477,531 A | 12/1995 | McKee et al. | 370/17 |
| 5,563,875 A | 10/1996 | Hefel et al. | 370/15 |
| 5,570,346 A | 10/1996 | Shur | 370/17 |
| 5,596,719 A | 1/1997 | Ramakrishnan et al. | 395/200.02 |
| 5,627,766 A | 5/1997 | Beaven | 364/551.01 |
| 5,633,861 A | 5/1997 | Hanson et al. | 370/232 |
| 5,668,800 A | 9/1997 | Stevenson | 370/248 |
| 5,734,825 A | 3/1998 | Lauck | 395/200.13 |
| 5,768,520 A | 6/1998 | Dan et al. | 395/200.53 |
| 5,781,534 A | 7/1998 | Perlman et al. | 370/248 |
| 5,793,976 A | 8/1998 | Chen et al. | 395/200.54 |
| 5,886,643 A | * 3/1999 | Diebboll et al. | 340/825.08 |
| 5,974,457 A | * 10/1999 | Waclawsky et al. | 709/224 |
| 6,215,774 B1 | * 4/2001 | Knauerhase et al. | 370/252 |
| 6,269,330 B1 | * 7/2001 | Cidon et al. | 704/43 |
| 6,297,823 B1 | * 10/2001 | Bharali et al. | 345/340 |
| 6,321,263 B1 | * 11/2001 | Luzzi et al. | 709/224 |
| 6,363,056 B1 | * 3/2002 | Beigi et al. | 370/252 |
| 6,408,335 B1 | * 6/2002 | Schwaller et al. | 709/224 |
| 6,473,404 B1 | * 10/2002 | Kaplan et al. | 370/238 |
| 6,513,060 B1 | * 1/2003 | Nixon et al. | 709/203 |

* cited by examiner

*Primary Examiner*—Steven H. D Nguyen
*Assistant Examiner*—Duc Duong
(74) *Attorney, Agent, or Firm*—Shelley M Beckstrand

(57) ABSTRACT

A communications network is evaluated by selectively sending and receiving a plurality of network evaluation signals through the network. Responsive to these evaluation signals, selective network evaluation parameters are determined and stored. Responsive to these parameters, the response time and throughput characteristics of the network are determined by means of algebraic and queuing theory derivations. Network response time analysis determines the apparent bandwidth, utilization, internal message size, queue factor, and device latency. Throughput analysis defines, calculates, and uses hop count, duplex, throughput and multi-server factors. Service level and capacity planning provides comprehensive "what-if" network planning facilities, including calculation of the change in network traffic before network response time service level is compromised; calculation of the additional file load capacity of the network; and determination of tuning recommendations for recommended window size for file transfer to fill remaining capacity.

44 Claims, 6 Drawing Sheets

SYSTEM AND METHOD FOR ANALYZING AND TUNING A COMMUNICATIONS NETWORK

BACKGROUND OF THE INVENTION

1. Technical Field of the Invention

This invention relates to testing and analyzing a communications network. More particularly, the invention relates to measuring, monitoring, estimating, capacity planning, and tuning of network performance and throughput.

2. Background Art

Users and managers of communications networks are interested in the capacity, performance, reliability, availability, topology, service level attainment, and modeling of their networks. Currently, many separate, incompatible, complicated, and often unsatisfactory tools are required to perform the tasks required by network managers. Existing network management and planning tools and methodologies suffer from at least one of the following current shortcomings:

1. require user knowledge of and input of current (and/or proposed) network topology;
2. require user to take a trace or multiple traces (snapshot of the network over a given time period) as a basis of analysis;
3. require network devices, for selected network events, to perform calculations and store their results for subsequent retrieval or periodic reporting of this information;
4. require clock synchronization for centralized coordination and analysis of the trace and/or stored data;
5. analyze a network on a hop-by-hop basis, rather than as a whole;
6. fail either to distinguish between or even to measure at all the network's response time capacity and the network's throughput capacity;
7. require user knowledge and input of the capacity of the various network components (e.g., processors, adapters, and local and wide area links), which may be based upon manufacturers' or suppliers' claims that are erroneous or not applicable to the users' environment;
8. require user knowledge and input of current network customization (e.g., tuning parameters); and
9. provide either analysis of the current performance and status of the network, or an estimation of the network assuming user-input changed load or configuration, or a database of the network's past condition; but not all functions together as a seamless, consistent whole.

Users and managers of networks frequently use TCP/IP pings (i.e., architected network echo packets) to check the availability of a target resource and the network connecting to it. In addition, ping programs commonly report the ping's round trip time, and users network managers can get a feel for the "usual" amount of time a ping should take between stations A and B on their network. Typically, the ping function provides one way and two way transfers. In one way pings, an echo server sends a packet to a device which discards the packet and returns a time stamp to the server. In two way pings, the device returns the packet with the time stamp.

U.S. Pat. No. 5,477,531 describes a technique of communication system analysis in which sequences of pings of different sizes are sent, transmitted in isolation from each other, in order to determine characteristics of the network beyond availability of resources and "usual" response time. In accordance with this technique, the best and mean times for the sequences of pings of different lengths are measured, and then the following are geometrically derived via use of the reciprocal of the packet size and bandwidth slope:

- the network path's bandwidth,
- the network path's propagation delay, and
- the network path's queuing time.

Further network testing involves sending bursts of pings to determine the loss rate of packets, from which the "internal packet size of the network" can then be determined. By this it is meant that the minimum device buffer size in the transmission path of the network can be discovered. The sending of bursts of pings of decreasing size is also described, the intent of which is to determine if smaller packets are prioritized over larger packets. In this way, the following is determined:

- the network path's minimum buffer size (also referred to as "internal packet size"); and
- the network's short frame prioritization capability.

As is recognized in this art reference, "there will generally be a plurality of network hops between the test station and the remote station, each with its own bandwidth. In these circumstances, taking the reciprocal of the slope of the line as the bandwidth is equivalent to saying that:

$$(1/\text{Bandwidth})=(1/b1 +1/b2+ \ldots 1/bn)$$

where $b1, b2, \ldots bn$ are the bandwidths of all the hops in the path. This will produce a bandwidth close to accurate only if there is one hop in the path that is significantly slower than all the others. Where this is not the case, the estimate may be inaccurate because no account is taken of the fact that for a multi-hop path, the intermediate nodes will delay onward transmission of a packet until the whole packet has been received."

Current network evaluation systems which send test packets through a network require that the evaluator have knowledge of the network's internal topology, require that special proprietary code be installed in intermediate network devices, and do not use queuing theory or provide an analytic evaluation of the test results.

Also, current network evaluation systems which perform queuing evaluation of a network require that the evaluator have knowledge of the network's internal topology, require storage and retrieval of data from intermediate network devices, require assembly and analysis of network traces that are depictions of the network at a given time, require knowledge of the detailed customization of all intermediate network devices, require knowledge of the capacity of each intermediate network device and device interface, and require intensive preparation to set up and use.

In addition, network traffic prioritization is currently being developed and implemented by many network equipment suppliers, who will provide prioritization by "type of service" (TOS) or "class of service" bits being set in network packets' headers. Consequently, there is a need for testing for the presence of network prioritization support and, if present, measuring network utilization and performance by means of discrete pings set at varying priorities.

The objects of the invention include providing an improved system and method for network measurement and planning.

The objects of the invention further include, for dealing with apparent bandwidth, a key concept for understanding the network's "response time" characteristics, providing an improved system and method for using "pings" of different sizes to deduce aspects of network performance including: determining network end-to-end bandwidth; determining network end-to-end queue delay; determining network end-to-end propagation delay; and determining network internal packet size.

The objects of the invention further include providing a system and method for: improving end-to-end bandwidth analysis; expanding the concept of a queue delay to one of a queue depth; and analyzing the unitary concept of end-to-end "propagation delay" as including two components; that is, (i) the end-to-end device latencies, plus (ii) the end-to-end (speed of light factored) propagation delay.

The objects of the invention further include providing a comprehensive end-to-end queuing theory system and method for network analysis.

The objects of the invention further include providing a system and method for distinguishing between and determining network response time and network throughput.

The objects of the invention further include providing a system and method for near-instantaneous network evaluations that analyze the current state of the network and allow for "what if" scenarios involving all performance components for network planning, including: determining end-to-end network utilization; determining average message size in the network (this is not to be confused with "network internal packet size", which is a measure of the minimum network device buffer size, not network user message sizes); determining end-to-end network device latencies; determining end-to-end network propagation delay (a function of distance and speed of light); determining network response times for messages of any specified length under a null network load ("estimated optimal network service level"); determining network response times for messages of any specified length under the current network load ("estimated current service level"); estimating network utilization level at which (a user-input) service level compliance is compromised; determining network "duplex", "hop count," "multiserver" and "throughput" factors (four new end-to-end measurement concepts for network analysis and capacity planning); determining optimal maximum network window size, based on user message size, assuming no competing traffic; estimating expected current window size for a given message size at current network utilization; estimating change in response time and optimal window size if servers and/or users are relocated (e.g., datacenter consolidation or move); estimating change in response time and optimal window size if apparent network bandwidth is changed; and estimating unidirectional and bidirectional file transfer throughput capacities and window sizes under null, current, or other network load conditions.

It is a further object of the invention to provide a system and method for evaluating key network performance parameters of concern to the managers, support personnel, and planners responsible for data communication and data, voice, and video communications networks.

It is a further object of the invention to provide a system and method for performing rigorous, real-time, queuing theory-based network analysis without need for knowledge of the components, topology or usage characteristics of the network.

It is a further object of the invention to provide a flexible, portable, easy to use network analysis method and system which works on a live network, provides instantaneous analysis of the current condition of the network, provides the capability to establish an historical database, and provides 'what if' analysis for future network changes.

It is a further object of the invention to provide a system and method for testing for the presence of network prioritization support and, if present, measuring network utilization and performance by means of discrete pings set at varying priorities.

SUMMARY OF THE INVENTION

In accordance with the invention, a system and method is provided for evaluating a communications network. A plurality of network evaluation signals, or probative test packets, are selectively sent and received through the network. Responsive to these evaluation signals, selective network evaluation parameters are determined and stored. Queuing theory analysis, responsive to these parameters, determines the response time and throughput characteristics, including capacity, utilization and performance, of the network.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
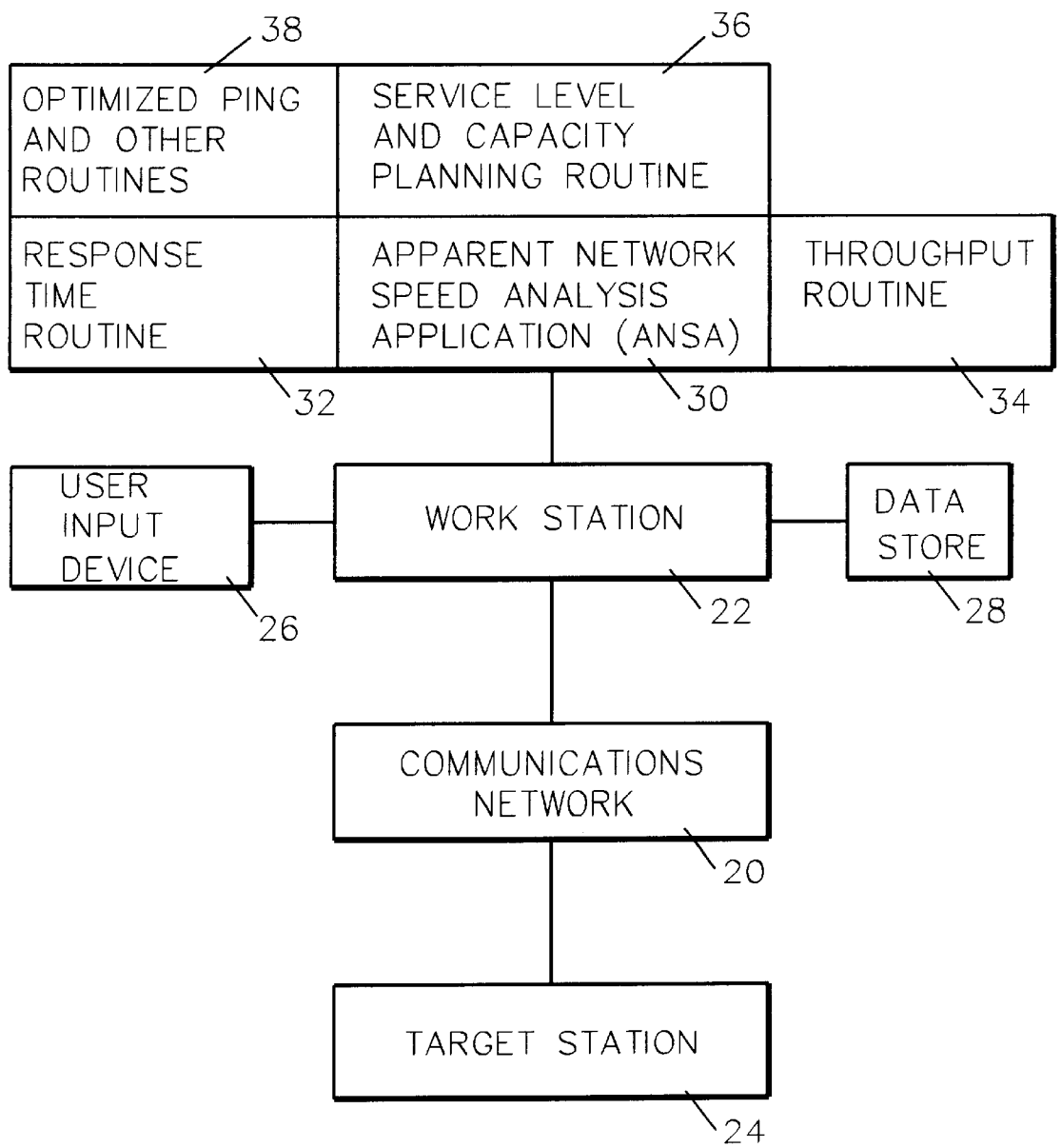
FIG. 1 illustrates a communications network and network evaluation system in accordance with the preferred embodiment of the system of invention.

The system and method of the preferred embodiment of the invention combines a new network probing test frame transmission method with a new network analysis method that views an entire network as a singular entity and creates a queuing theory model for the network as a singular entity. In order to establish the historical, current, and predicted future of states of a network for all types of network traffic, including interactive, browser, batch, and realtime traffic, probative transmissions, including echoed and non-echoed packets, of like and differing lengths, of like and differing network priority, individually and in streams, are sent and transit times measured, and queuing theory applied to the results.

The system and method of the preferred embodiment of the invention adds function to each of two known arts and then combines them. Specifically, this method of the preferred embodiment of the invention combines the hitherto separate arts of (1) sending probative test packets across a live data communications or data and voice communications network and (2) applying queuing theory to the test results to determine the capacity, utilization, and performance of the network.

Probative testing techniques previously known in the art make no use of queuing theory, and queuing theory techniques previously known in the art make no use of probative testing. In accordance with the present invention, probative testing and queuing theory are combined in a new methodology. In accordance with this new methodology, new concepts and means for testing to discover their values are provided. The subjects for probative testing are for the four principle types of network traffic, which are (1) voice/video, (2) client/server transaction, (3) web browser, and (4) batch file, print, and fax.

Response time has four components: (1) serialization/deserialization time (for a message length), (2) device latency, (3) propagation delay, and (4) queue delay. In accordance with the method of the invention, apparent bandwidth is used as the basis for deriving serialization/deserialization time. Apparent bandwidth is derived by subtracting short ping time from long ping time (discrete pings). Pings also determine the network's latency. Network quality factor is used in a propagation delay formula for distinguishing between device latency and propagation delay latency. The network's queue is measured as a number of messages on a queue and their size, thus determining the network's average message length. Measuring the number of messages on the queue and their length is the key for application of queuing theory.

In addition to knowing the average network message size, queue analysis is dependent on discovering utilization. Heretofore, utilization has been calculated by means of stored information at various points along the network for hop-by-hop analysis or else by estimating a message arrival rate, the server (i.e., network) speed, and the number of servers. In accordance with the invention,. probative testing is used to determine the state of the live network as an end-to-end entity rather than relying on user estimates or data stored in the network. In order to measure network utilization and apparent bandwidth and latency in support of queue analysis for the network, the number of messages on queue is derived from utilization. Heretofore, queuing theory-based methodologies derived utilization from the arrival rate of messages.

In accordance with the present invention, the formula $u/(1-u)$ is used for number of messages on queue and in service. Thus, the system and method of the present invention views the network as a singular end-to-end entity. The number of servers ("n") must also be determined in order to derive the multiserver value from the formula $u^n/(1-u^n)$. Prior means of calculating multiserver queue behavior involved use of Poisson distributions and Erlang functions. One text on queuing states:

"As can be seen, this [Poisson, Erlang] quantity is a function of the number of servers and their utilization. Unfortunately, this expression turns up frequently in queuing calculations and is not easy to compute. Tables of values are readily found, or a computer program must be used." (Stallings, High Speed Networks: TCP/IP and ATM Design Principles, Prentice Hall, 1998, pp 162–3.)

In accordance with the present invention, the formula $u^n/(1-u^n)$ is provided as a new measure for queue buildup based on utilization for multiserver systems. It represents an accurate generalization of tables of the sort referred to by Stallings, greatly simplifies prior methods for multiserver queue analysis, and together with the new techniques described below for probative network testing to derive a value for the networks multiserver factor, provides calculations appropriate for the testing and measurement of all kinds of network traffic in all topologies and for deriving queuing theory based evaluations of past, current, and future (i.e., "what-if" analysis of) network behavior.

In addition to response time, the network's throughput characterisitics is determined by streaming of pings (one way, with "discard"). This is used to determine the network's throughput bandwidth. The network's throughput bandwidth number is then divided by the apparent bandwidth number to get the network's "hop count factor," which in accordance with the present invention is used for relating the response time bandwidth of the network to the network's throughput bandwidth.

Two way streaming tests for and measures the networks two-way thruput bandwidth. Then, dividing the two-way throughput by the one way throughput provides the network's "duplex factor". Additional testing provides for multistreamed testing, across multiple adapters, to determine whether there are multiple paths available between the source and target across the network. In this manner "multistream thruput," is derived. The multistream throughput divided by thruput bandwidth (or duplex thruput as applicable) equals the multiserver factor. This multiserver factor is then used to calculate a revised value for the equation for number of messages on queue. So where "n" is the multiserver factor, in accordance with the present invention the number of messages on queue (and in service) is derived from $u^m/(1-u^m)$. It is by means of discrete echo testing, throughput testing, the concepts and measurement of hop count, throughput factor, duplex factor, and multiserver factor, and the application of queuing theory that the full measure of a network's capacity and performance for all types of network traffic is provided by the present invention.

The system and method of the preferred embodiment of the invention derives average message length for all priorities, derives queuing theory input for all priorities, determines arrival rates and utilization, stores the results in database, derives expected current window size, optimal window size, expected current average (or by percentile) network response time for user-input message lengths, derives utilization at which response time requirement is not met, and performs what-if analysis of such cases as change of location of servers or users, in utilizations (by priority), in utilization by user traffic pattern, in device latencies and in bandwidth.

Further in accordance with the preferred embodiment of the invention, a system and method is provided for evaluating the four key categories of network performance of concern to the managers, support personnel, and planners responsible for data communications and data, voice and video communications networks. Those categories are: (1) performance of the network in support of single turnaround, response time dependent traffic, such as interactive Telnet and IBM 3270 traffic; (2) performance of the network in support of multiple turnaround, response time dependent traffic, such as Intranet and Internet browser traffic; (3) ability of the network to support throughput dependent traffic, such as file, print and fax traffic; and (4) ability of the network to support realtime traffic, such as voice and video traffic.

Further in accordance with the preferred embodiment of the invention, the entire network under evaluation is treated as a unitary entity, or 'black box', that connects a client to a server, and a connection across this network entity is analyzed by sending probative test packets into the network and using queuing theory to assess all factors relevant to the network's current and future abilities with respect to each of the above described four network performance categories.

In accordance with the invention, network testing is performed by transmitting packets among devices in or attached to a network, including tests (a) through (g), as follows:

(a) sending echo or discard packets (e.g., pings) of uniform length, isolated from one another by fixed intervals;

(b) sending echo or discard packets of uniform length in a stream;

(c) sending echo or discard packets of different lengths, isolated from one another by fixed intervals;

(d) sending a file (or equivalent batch transfer) unidirectionally across the network, repeating with different packet sizes;

(e) sending a file bidirectionally across the network, repeating with different packet sizes;

(f) sending multiple files unidirectionally across the network; and/or (g) sending multiple files bidirectionally across the network.

In each of the above test transmissions, a transmission priority may be specified that varies between different types of tests or between multiple iterations of one particular type of test. For example, runs of type (d) may be done at batch (low) priority, while runs of type (c) may be run at interactive (higher) priority. Also, packets and files sent in each of the above test types may be sent in connection oriented or non-connection oriented modes. Echo packets and one way packets contain sequence numbers, time stamps and/or network priority indicators.

Further in accordance with the invention, queuing theory is applied to the results of the above tests to mathematically evaluate the network under test. Four separate measures of the capacity or performance of the network are provided. These measure the ability of the network to transport the following:

1) query and response, and other transaction-type, traffic within an acceptable time frame, usually referred to as 'network response time' and measured in milliseconds;

2) a series of screen images (browser-type activity) within an acceptable time frame, usually measured in seconds;

3) file, and other batch-type, traffic within a required period of time, often measured in minutes or hours; and 4) video, voice, and other realtime-type traffic, referred to as the network's 'realtime traffic ability', and usually measured in terms of both the availability of at least the minimum amount of network bandwidth required for the connection and the consistency of the network's transmission characteristics supporting the connection, referred to as 'jitter', and usually measured in microseconds or milliseconds.

In accordance with a further embodiment of the invention, response time and throughput in prioritized networks may be calculated by first detecting whether prioritization has effect in the network, determining the utilization of the network at different priority levels, and then deriving predictive results for current and future response time and window sizes for different types of service.

Referring to FIG. 1, in accordance with the preferred embodiment of the invention, apparent network speed analysis (ANSA) application 30 executes on workstation 22 to measure, monitor, estimate, capacity plan, and tune communications network 20 with respect to target station 24. A user input device 26 and data store 28 are provided at work station 22, and ANSA 30 includes a response time routine 32, a throughput routine 34, a service level and capacity planning routine 36, and optimized ping and other routines 38.

Network response time analysis routine 32 provides for determination of the apparent bandwidth, utilization, internal message size, queue factor, and device latency of communications network 20.

Throughput analysis routine 34 provides for defining, calculating, and using the following new network concepts: Hop Count Factor, Duplex Factor, Throughput Factor, and Multi-Server Factor.

Service level and capacity planning routine 36, responsive to the skilled use of routines 32 and 34, provides comprehensive "what-if" network planning facilities; calculation of the increase (or change) in network traffic before network response time service level is compromised; calculation of the additional file load capacity of the network, which is the additional file load before response time is compromised (for both prioritized and non-prioritized network cases); and determination of tuning recommendations for recommended window size for file transfer to fill remaining capacity (both respective and irrespective of maintaining response time service level, and for both prioritized and non-prioritized cases).

Optimized ping and other methodologies routines 38 provides for optimized pinging, and extensions for ping, transaction, file echoing, bursts, multistreaming, and unidirectional transmission and recording.

Further in accordance with the preferred embodiment of the method of the invention, the above methodologies are based upon the sending and receiving of:

discrete one-way and/or echoed packets streamed one-way and/or echoed packets multistreamed one-way and or echoed packets uni and bi-directional file transfers multistreamed file transfers.

These packets and files comprise transmission and receipt of industry standard packet and frame-types (e.g., TCP/IP "ping" and "FTP"), as well as frames with specialized header and/or data content (e.g., time-stamps and sequence numbers).

Various functions performed by the method of the invention may require some or all of the above send/receive sequences. For example, certain functions can be performed just by sending isolated pings, with no requirement for transmission of streamed pings or file transfers.

In accordance with the preferred embodiments of the invention, specified facts regarding the transmission and receipt of these files and packets are calculated and/or recorded. These facts include, but are not limited to, number of packets sent, number of packets received, timestamp of when packet was sent, timestamp of when packet was received, number of bytes in packet, packet one-way and/or round trip time, best/average/worst/standard deviation (etc.) for packets of each length sent in a given sequence, and total bytes sent/received in a given unit of time.

Packet and file sending and receipt is performed from work station 22, which may be a dedicated network management station or stations, a station temporarily attached to network 20, devices in the middle of the network 20 capable of running code 30 executing the methods of the invention, or other user stations (e.g., clients or servers) attached to or in network 20.

Data concerning packet and/or file transfers and receipts data is stored in data store 28 and analyzed to determine, for example, but not limited to, the current performance of network 20 (including adherence to service-level agreements), the capacity limits of the network, and the current utilization of the network. The stored data is also used for analysis of "what if scenarios" involving analysis of the effect on network performance and capacity of user-specified changes to network bandwidth, changes to server or client location (e.g., data center move), implementation of network devices with changed latencies, or increase or decrease of network utilization. The data that is obtained and stored is also used for network tuning recommendations (e.g., connection window sizes) and to assist in problem determination and capacity planning (e.g., determining the network utilization level at which a specified service level will be compromised). This data is also used for service level compliance and network availability reporting.

Figure 2:
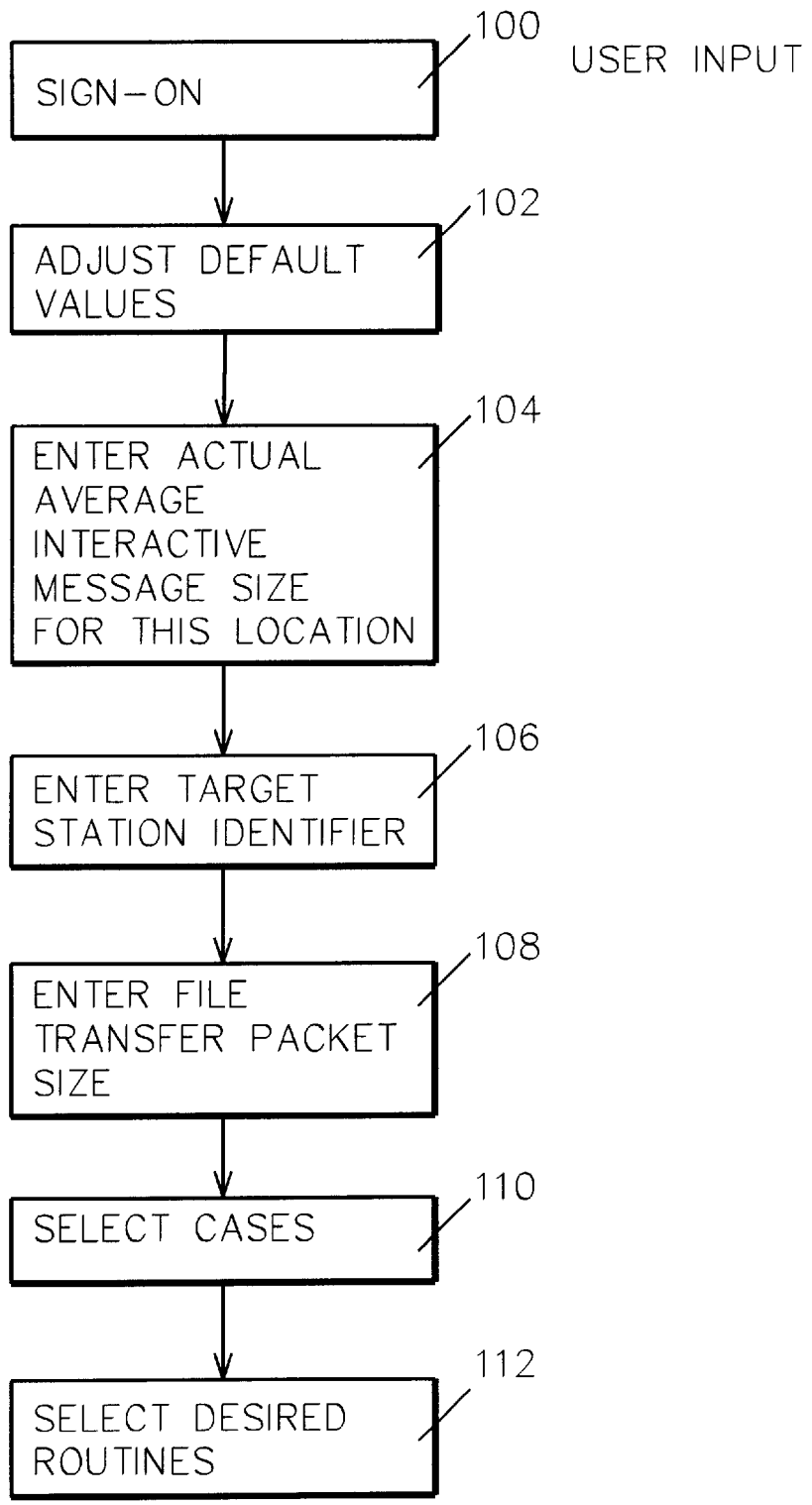
FIG. 2 illustrates a representative logic flow for user input.

Referring to FIG. 2, in accordance with the preferred embodiment of the method of the invention, in step 100 the user signs on through input device 26 to the apparent network speed analysis application (ANSA) 30.

In step 102, the user adjusts default values, if desired. These default values include number of short or long pings, number of bytes per ping, and time between pings.

In step 104, the user enters the actual average interactive message size from this location, if desired, for the actual window size calculation (User Window Size Calculation) below.

In step 106, the user enters the IP address (or name) of the target station 24.

In step 108, the user enters the file transfer packet size.

In step 110, the user selects any or all of hop count, duplex, and streaming file transfer cases if throughput analysis is desired.

In step 112, the user selects a desired interactive (transaction response time-oriented) window recommendation routine and/or batch (file transfer) window estimation routine.

Figure 3:
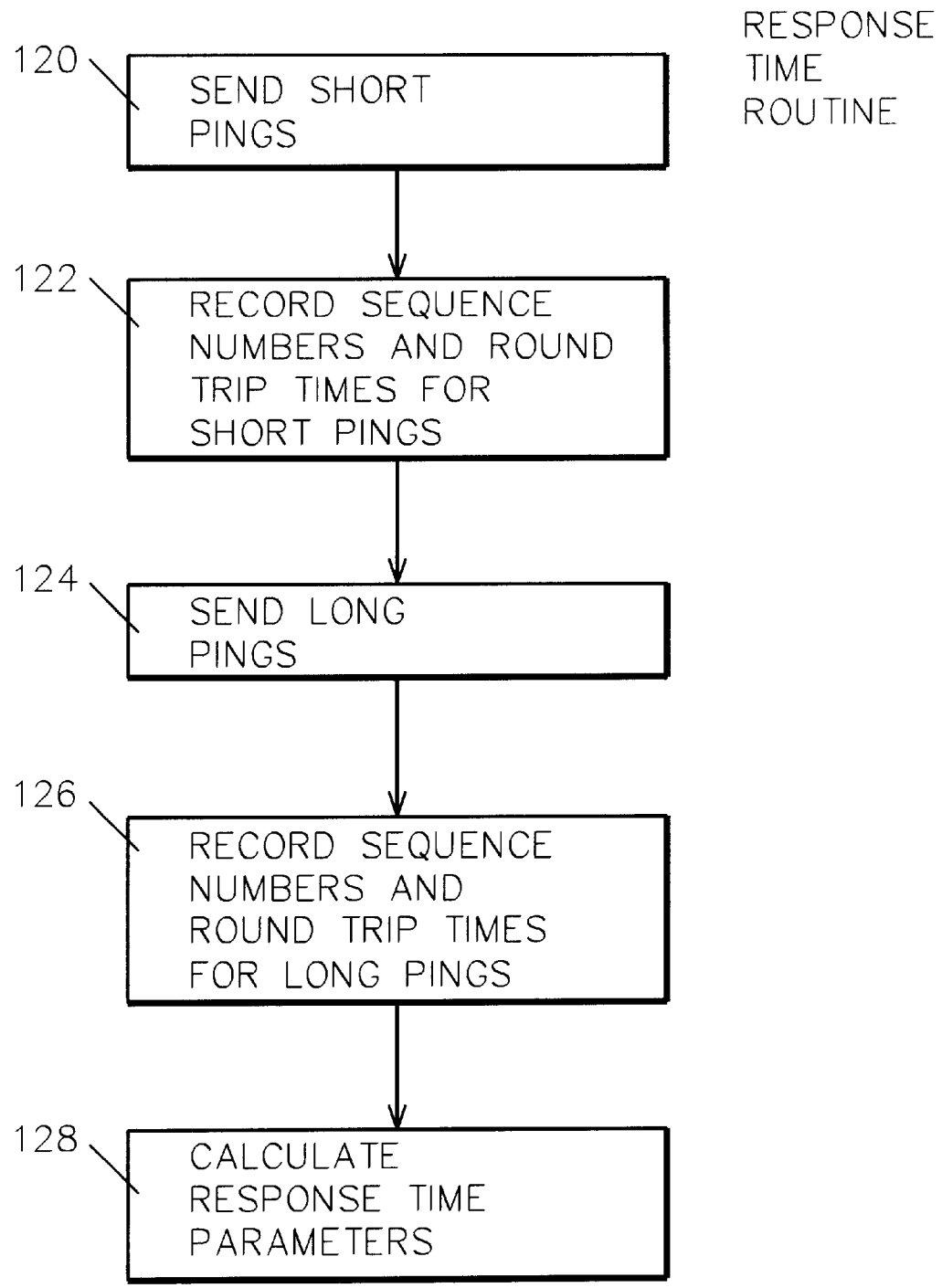
FIG. 3 illustrates the logic flow of the response time routine of the preferred embodiment of the invention.

Referring to FIG. 3, in accordance with a preferred embodiment of the invention, the apparent network speed analysis application (ANSA) 30 performs its response time routine 32.

In step 120, ANSA 30 sends to target station 24 over communications network 20, for example, 10 short pings of 64 bytes, 10 ms apart, unless modified in step 102 to new values.

In step 122, ANSA records the sequence numbers and round trip times for the short pings.

In step 124, ANSA sends, for example, 10 long pings of 1464 bytes, 10 ms apart, unless modified in step 102 to new values.

In step 126, ANSA records the sequence numbers and round trip times for the long pings.

In step 128, ANSA calculates, in a manner to be more fully described hereafter, response time parameters, including the following values, from the set of long and short pings: apparent bandwidth, current available bandwidth, current unavailable bandwidth, apparent utilization, apparent latency, average queue time, apparent queue depth, apparent queue factor, apparent average network message length, apparent maximum user window size, estimated current user window size, apparent jitter, estimated path propagation delay, apparent device latency, estimated optimal network service level, estimated current network service level, and estimated network utilization level at which service level compliance is compromised.

In these calculations, described hereafter, ANSA treats pings that timeout (no response received) effectively as 100% utilization events in the calculations and also as having consumed the user specified ping timeout value.

Figure 4:
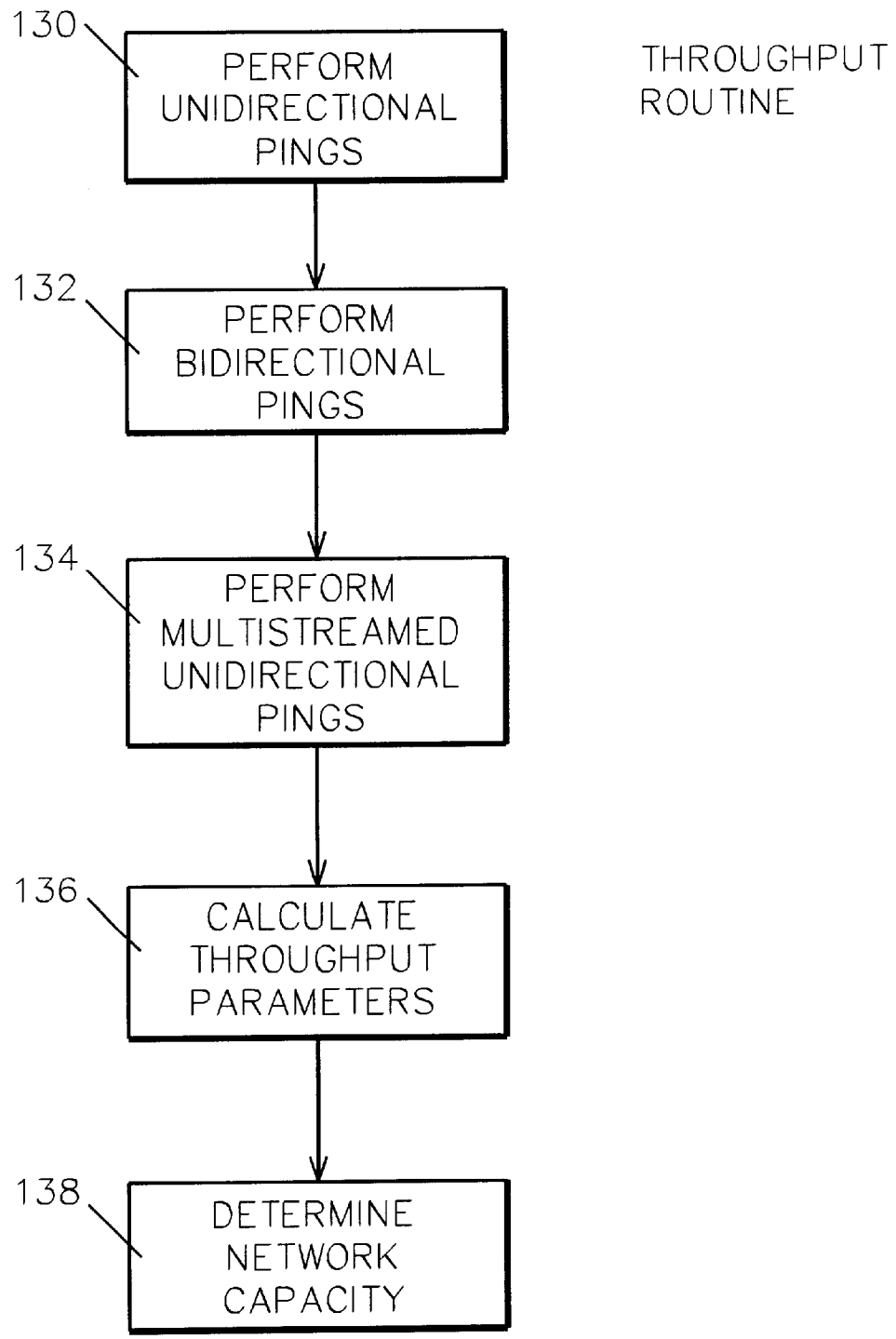
FIG. 4 illustrates the logic flow of the throughput routine of the preferred embodiment of the invention.

Referring to FIG. 4, in accordance with a preferred embodiment of the invention, the apparent network speed analysis application (ANSA) 30 performs its throughput routine 34. Responsive to user selection of cases or functions in step 110, ANSA performs any or all of the functions in steps 132–138:

In step 132, ANSA 30 performs a unidirectional file transfer (FTP) or stream of unidirectional (non-echoed) pings.

In step 134, ANSA 30 performs a bidirectional, concurrent file transfer or stream of echoed pings.

In step 136, ANSA 30 performs a multistreamed file transfer or unidirectional set of pings. By multistreamed is meant that multiple sockets and/or multiple network adapters are concurrently used to access the same target workstation In step 138, ANSA 30 determines network capacity by calculating such throughput parameters as hop count, duplex, and total throughput factors, as will be described more fully hereafter.

Figure 5:
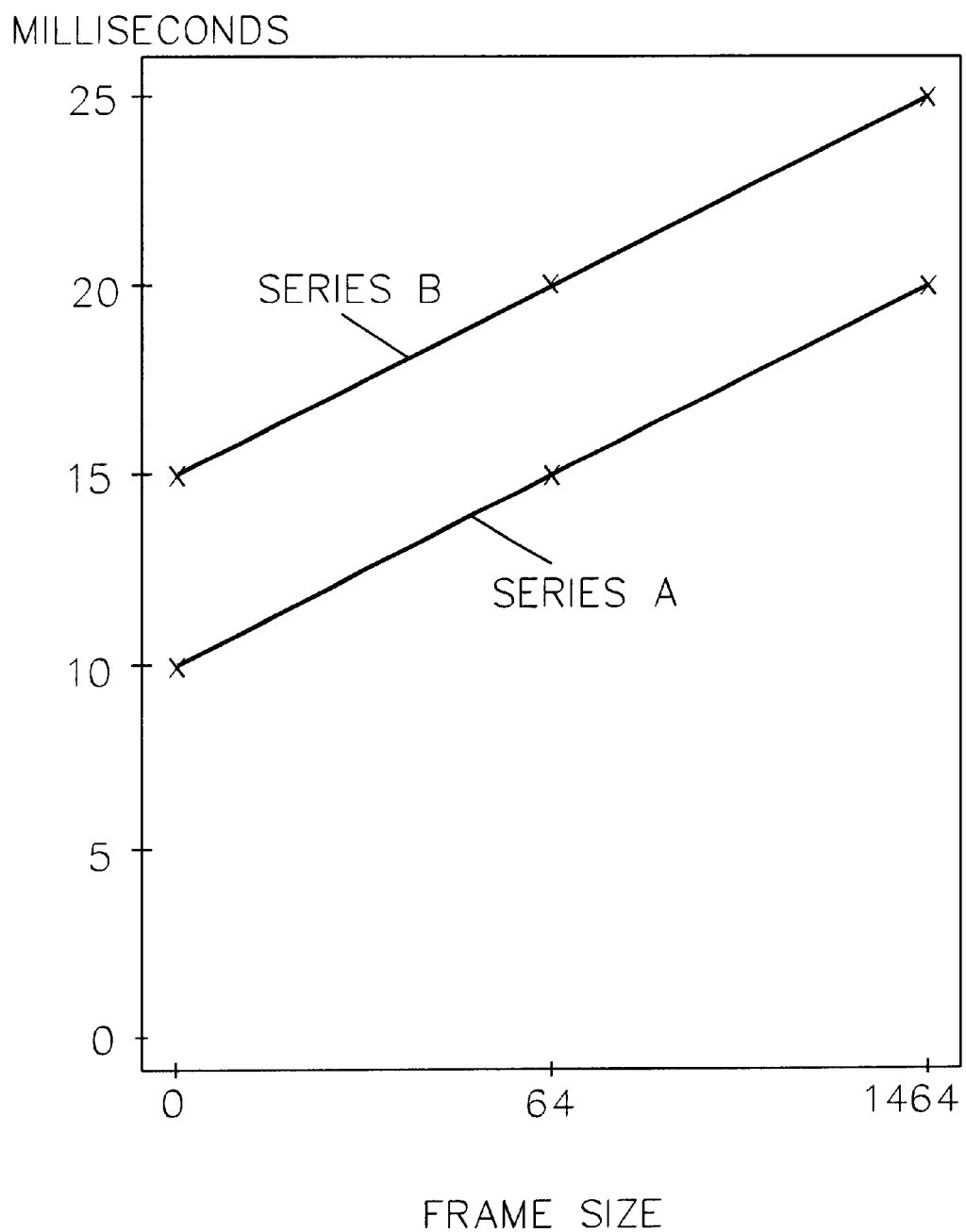
FIG. 5 geometrically illustrates ping results and bandwidth, utilization, and message size derivations in accordance with the preferred embodiment of the invention.

Referring to FIG. 5, a geometric depiction of ping results and bandwidth, utilization, and message size derivations (based on the slopes of lines, perpendicular intercepts, and other geometric relations) is illustrated.

Figure 6:
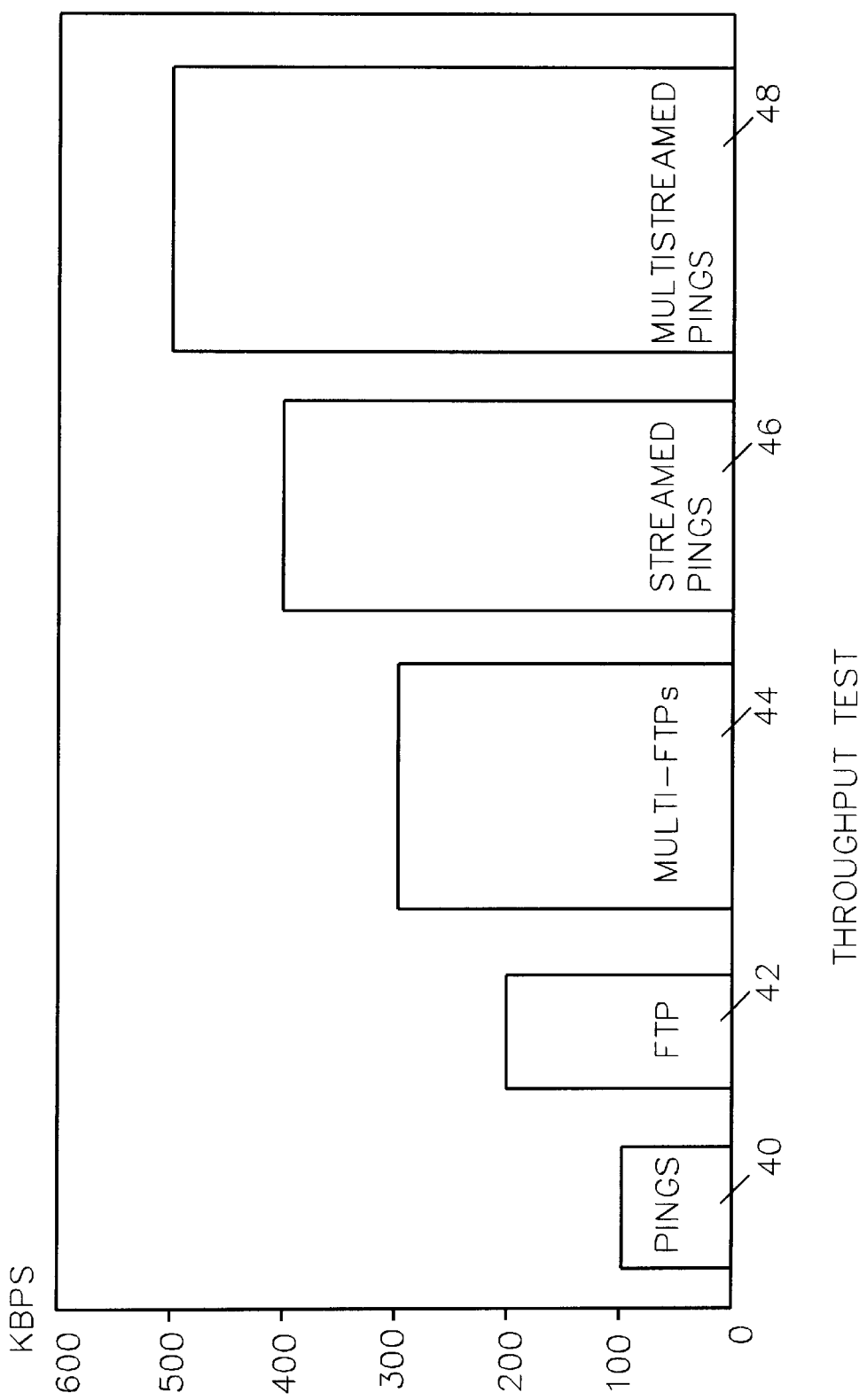
FIG. 6 illustrates five bar graphs depicting bits per second transmitted and received under discrete pinging, FTP or one-way ping streams, and 2-way ping streams.

Referring to FIG. 6, five bar graphs depicting bits per second transmitted and received under discrete pinging, FTP or one-way ping streams, and 2-way ping streams are shown. The ratios for hop count, duplex, and total throughput factors are illustrated, and may be derived from, these bar charts.

Referring again to FIG. 5, Series A has three data points at times 10, 15, and 20 milliseconds. Series A points 15 and 20 represent the best ping times for frame sizes of 64 and 1464 byte pings, respectively. Series B has three data points at times 15, 20, and 25 milliseconds. Series B points 20 and 25 represent the average times for frame sizes of 64 and 1464 byte pings, respectively. Let (0,0) represent the origin point. The perpendicular (vector) from point 10 to point 0 represent the network latency of 10 ms. The line length between Series A points 10 and 15 gives the average network queue time (5 ms), although it is best computed by adding the lengths of segments (20,15) and (25,20) and dividing by 2. The reciprocal of the slope of Series A gives the apparent bandwidth (end-to-end network capacity for response time service).

Apparent bandwidth measures the network path's response time capacity for discrete transactions. In accordance with the invention, a system and method is provided for determining file/batch network throughput capacity by adding file (for one-way, therefore, half-duplex analysis) and ping streaming mechanisms for bidirectional (and, therefore, full duplex) analysis. In addition, the system and method of the invention allows for streaming pings or files in such a manner as to determine whether there exist multiple network paths to support connections across network 20 to target station 24. The system and method of the invention thus covers network capacity for response time as well as throughput across all network 20 topologies.

Referring again to FIG. 6, the x-axis depicts five different bandwidth tests, designed to determine whether the network has full duplex, multihop, multipath, or multilink capacity. The y axis represents throughput for each test in kilobits per second between two endpoints (for example, work station 22 and target station 24). Ping test 40 is indicative of single user end-to-end transaction response time. FTP 42 and streamed ping 46 cases (or multistreamed versions 44 and 48) can be used to derive multiplicative factors to determine network 20 capacity for utilization calculations. For example, dividing streamed pings 46 throughput bandwidth by FTP's 42 throughput bandwidth gives the networks "duplex factor" (its relative capability to handle duplex traffic). Dividing FTP 42 throughput bandwidth by discrete ping 40 throughput (apparent bandwidth) gives the network's "hop count factor" (the relative contribution of multiple hops to reducing the apparent bandwidth). Dividing streamed ping 46 throughput by discrete ping 40 throughput gives the "total throughput factor", which is the total capacity of the network as compared with the apparent bandwidth—this is important for some utilization calculations. For multiserver queuing factor, "M", the multistreamed FTP 44 value is divided by apparent bandwidth 40.

Referring again to the geometric representations of FIG. 5, series B line is drawn through points 25 and 15. The reciprocal of its slope represents the (discrete response time) bandwidth available in network 20. Subtracting this from the apparent bandwidth gives the bandwidth currently in use. Dividing bandwidth currently in use by apparent bandwidth and multiplying by 100 gives percent utilization. A skilled practitioner may wish to divide the current in use number by one of bandwidths 40–48 in FIG. 6 if it is determined that one of them is relevant to the bandwidth available for response time.

In accordance with a specific embodiment of the invention, the explicit formulas calculated by ANSA 30 are set forth hereafter. By deriving apparent bandwidth (response time capacity), apparent utilization, and the network message size, all of queuing theory is now available for analytic and predictive purposes and can be applied as exemplified in the following formulas. The following formulas exemplify a subset of the uses for the probative testing and analytic methodologies enabled by the discovery of the concepts of, and means of discovering the values for, apparent bandwidth (network response time capacity), apparent utilization, the network message size, network latency, and the network's throughput and multi server factors. These new concepts, used in combination, allow derivation of the various network performance and capacity parameters by the general application of queuing theory.

Apparent bandwidth (the actual maximum amount of bandwidth available, from a response time perspective, between the ANSA test station and the target station)—
Formula:

$$\text{(long ping bits−short ping bits)}*2/\text{(best long ping ms−best short ping ms)}=\text{apparent bandwidth} \quad (1)$$

Apparent bandwidth is an unitary measure of the actual effective end-to-end wire speed or bandwidth of the entire set of network components connecting stations across the network insofar as they support interactive response time. Data used in formula (1) is obtained by sending packets of different lengths. Priority bits (e.g., TCP/IP type of service) are used to distinguish levels of service in the network.

Current available bandwidth (the actual amount of bandwidth available between the test and target stations that is not currently in use by other stations)—
Formula:

$$\text{(long ping bits−short ping bits)}*2/\text{(avg long ping ms−avg short ping ms)}=\text{current available bandwidth} \quad (2)$$

Current unavailable bandwidth (the actual amount of bandwidth between the test and target stations currently in use by other stations)—
Formula:

$$\text{apparent bandwidth−current available bandwidth}=\text{current unavailable bandwidth} \quad (3)$$

Apparent utilization (the percentage of the apparent bandwidth that is currently in use by other devices sharing portions of the network path)—
Formula:

$$\text{(current unavailable bandwidth/apparent bandwidth)}*100=\text{apparent utilization} \quad (4)$$

Apparent latency (the sum of all propagation delays plus all device processing delays within the network between the test and target stations, one way). Without loss of generality, best long ping result or averaged combination of best long and best short ping could be used.
Formula:

$$\text{(best short ms−(number of short bits/apparent bandwidth))}/2 \quad (5)$$

Average queue (the time in ms that 50th percentile packets (#) spend on queue). Without loss of generality, long ping or averaged combination of long and short pings could be used.
Formula:

$$\text{(average short ms−best short ms)}/2=\text{average queue ms} \quad (6)$$

(Formulas (1) through (6), supra, are illustrated in the geometric representations of FIG. 5, as previously described.)

Apparent queue depth (the average number of bytes in network buffer and processor queues between the test and target stations)—
Formula:

$$\text{apparent bandwidth}*\text{apparent queue depth}/8=\text{apparent queue depth (two way)} \quad (7)$$

Apparent queue factor (the average number of packets in network queues between the test and target stations, round trip, assumes MM1, single server queuing.)
Formula (apparent utilization is expressed as a decimal in this formula):

$$\text{apparent utilization}/(1-\text{apparent utilization})=\text{apparent queue fact} \quad (8)$$

Apparent queue factor is used for end-to-end network measurement, and is derived from apparent utilization.
The apparent queue factor formula in (8) is for single server queue systems. This can be adjusted for multiserver queue analysis by using the multiserver factor derived from the previously described throughput tests (b), (d), (e), (f), and (g) compared with the discrete packet send tests results of (a) and (c), as follows:

(8.1) Compare discrete ping result's apparent bandwidth with FTP determined bandwidth. FTP bandwidth should be greater than or equal to apparent bandwidth. Theoretically, in a 2 hop network 20 with equal speed hops, FTP bandwidth will be twice the apparent bandwidth.

(8.2) Compare the streamed ping (or a bidirectional FTP) bandwidth to the FTP bandwidth. If the network is full duplex, theoretically, the streamed ping bandwidth will be twice the FTP bandwidth.

(8.3) Compare the multistream FTP (i.e. a file transfer or unidirectional ping stream to separate sockets for true concurrency) to the single FTP. It should be greater than or equal to the single stream. If so, the ratio represents the "multiserver factor," used in queuing theory in utilization formulas. In ANSA 30, utilization is used to derive the network message size. For a multiserver factor of value n, n would be used as an exponential value in the formula.

Using the notation "3^2" to mean "3 to the power 2", the formula for a system with n servers (a factor of n), the apparent bandwidth is adjusted to the value of an FTP or streamed ping (or multistream version of either of these), by calculating the utilization 'u', and then using the formula $$u^n/(1-u^n), \quad (9)$$

to derive the apparent queue factor, from which the network's average message size may be derived. Mathematically, for a given utilization and queue depth, as n (number of servers) increases, the queue factor decreases, which means message size is greater (i.e., there are fewer, but larger messages). This is important for predicting both response time and variation in response time.

Apparent average network message length (the average length of all queued and in service messages from all users between the test and target systems)—
Formula:

$$\text{apparent queue depth/apparent queue factor} = \text{apparent average network message length} \quad (10)$$

Apparent maximum user window size (the connection-level window size, based upon average user message length, in bytes, one way, input by the user)—
formula:

$$(((\text{average user message length} + \text{acknowledgment message length})*8)/\text{apparent bandwidth}) + \text{apparent latency})/\text{average user message length} \quad (11)$$

The derivation of apparent maximum user window size involves apparent bandwidth. It is illustrative to compare this concept with apparent utilization and apparent average network message length. These latter two are new concepts that apply what had previously been construed of only on a hop-by-hop basis to the network across all hopes. Maximum window size is a concept which has always applied end-to-end, but heretofore has been derived from a hop by hop analysis.

Estimated current user window size—
Formula:

$$(((\text{average user message length} + \text{acknowledgment message length})*8)/\text{current available bandwidth}) + \text{apparent latency})/\text{average user message length} = \text{estimated current user window size} \quad (12)$$

Apparent jitter (the statistical variation between ping results expressed as the standard deviation)—
Formula:

$$(\text{standard deviation of short pings} + \text{standard deviation of long pings})/2 \quad (13)$$

Estimated path propagation delay (user inputs one way mileage between end points and a network quality factor of between 1.5 and 2.5, default=2)—
Formula:

$$(\text{one way mileage}/186000)*\text{network quality factor} = \text{estimated path propagation delay} \quad (14)$$

Without loss of generality, kilometers or other measure of distance can be used, as can use of other network quality default ranges. Estimated path propagation delay is, in accordance with the invention, derived from the network quality factor. The network quality factor is a constant value derived either from general experience or from specific testing of a given connection. For current high quality, wide area network connections, such as over AT&T, WorldCom, Sprint, and Nippon Telephone and Telegraph) a default value of 2 is appropriate. The value is best derived by point to point pinging over an otherwise empty network connection between devices separated by a wide area network for which the connection's distance and end-device latencies are known. Then total ping bits*2 is divided by apparent bandwidth to get the ping round trip service time. Each end device latency is multiplied by two to get round trip device latency. The distance (in miles)*2/speed of light (in mph) yields the round trip speed of light delay. Then, round trip ping time−(round trip service time+round trip device latency+round trip speed of light delay) yields the round trip network quality delay time. Then, network quality delay time/round trip speed of light equals the network quality factor. This represents the proportion of time that a wide area network providers' network equipment, routing, and physical delays increase the propagation delay over that expected merely by the speed of light factor.

Apparent device latency (processing time total for the network devices along the path)—
Formula:

$$\text{apparent latency} - \text{estimated path propagation delay} = \text{apparent device latency} \quad (15)$$

In accordance with the invention, apparent device latency is derived by viewing the network as a single device with a singular latency value.

Estimated optimal network service level (based on user input of application-level input and output message lengths)—
Formula:

$$(\text{user message length/apparent bandwidth}) + (\text{apparent latency}*2) = \text{estimated optimal network service level} \quad (16)$$

Estimated current network service level (based on user input of application-level input and output user message length, without loss of generality for 50th percentile responses)—
Formula:

$$(\text{user message length/apparent bandwidth}) + (\text{average queue time} + \text{apparent latency})*2 = \text{estimated current network service level} \quad (17)$$

Estimated network utilization level at which service level compliance is compromised (user inputs a time value, t, and ANSA 30 determines the network utilization level that will cause, without loss of generality (for this could be done for 90th or any other percentile), an average response time of t in this network.)

Formulas: first perform an internal mathematical check that estimated optimal network service level 'a' is less than or equal to 't', the target value, where $$a = [\text{network latency} + (\text{number of bytes per message/apparent bandwidth})]. \quad (18)$$

If t>a, no further calculation is performed and the service level is flagged as unattainable.
If a=t then utilization must be 0%.
If a <t, then, subtract, $$t - a = q, \quad (19)$$

so that q is the maximum allowable average queue time that will comply with the required average network response time service level, t. Utilization 'u' is derived by determining the queue factor that will result, on average, with a value of q. Having previously determined the apparent bandwidth of the network 'b' and the average network message size 'm', perform $$(q \times b)/8 = z, \quad (20)$$

so 'z' is the number of bytes on network queues. Then divide, $$z/m \quad (21)$$

which is the network queue factor at which response time equals t. The utilization level 'u' at which this occurs is:

$$u=((z/m)/(1+(z/m)))^\wedge(1/n). \quad (22)$$

where u is the utilization in decimal, so multiply by 100 for percent. From formula (22) 'n' is the indicator of the multiserver factor of the network. For the single server queue case (also referred to as the MM1 case), or where throughput testing will not be performed, n=1. Therefore, u represents the maximum utilization level at which service level compliance can be achieved on average.

Important aspects of the preferred embodiment of the invention are set forth in the formulas (18)–(22) for estimated network utilization at which service level compliance is compromised, for both ANSA end-to-end type network performance and network queuing analysis, as well as for "non-ANSA" hop by hop traditional analysis.

Formulas (1) through (22) provide a basis for a new end-to-end network queuing theory methodology. By providing a system and method for determining network speed, utilization, total latency, and latency broken up into device and propagation delay components, the questions generally asked for detailed network analyses for capacity planning, recovery, and service level compliance (such as response time, reachability, and availability) are readily answered. By this invention answers are provided to such questions as, for example, what will be the effect on response time if a server is moved, some network devices are removed and replaced with devices with different latencies, network utilization or link speed is changed, or a satellite connection is changed, or any combination of these?

In accordance with a preferred embodiment of the invention, a method for network measurement and planning is provided. Probative test packets are sent across a live communications network to derive test results and queuing theory is applied to the test results to determine the capacity, utilization and performance of the network. Traffic on the network may include one or more of voice and video traffic, client server transaction traffic, web browser traffic, and batch file, print and fax traffic. Measurement of responsive time includes measurement of the response time components of serialization or deserialization time, device latency, propagation delay and queue delay. Apparent bandwidth is calculated as the difference between short ping time and long ping time for discrete pings, and for a given message length the serialization or deserialization time is calculated as a function of apparent bandwidth; device latency is a function of ping times; propagation delay is a function of network quality factor; and device latency and propagation delay latency are distinguished as a function of the network quality factor. Queue delay is determined by measuring the queue as a number of messages on queue as a function of network utilization level and the size of said messages as the average network message length. Probative testing is used to determine the state of the network as an end-to-end entity; and the number of messages on queue and in service is u/(1−u), where u is the network utilization level. The multiserver value is derived as u^n/(1−u^n), where n is the number of servers in the path through the network. The throughput characteristics of the network are determined, including the network throughput bandwidth which is derived by streaming pings one way with discard. A hop count factor is derived as the network throughput bandwidth divided by the apparent bandwidth for relating the respond time bandwidth of the network to the network throughput bandwidth, while two way streaming is performed to test for two way throughput bandwidth. Two way throughput bandwidth is divided by the network throughput bandwidth to derive the duplex factor for the network; and true queue depth is derived as the network throughput bandwidth times network queue time divided by 8. Multistream throughput is derived selectively responsive to one way streaming or two way streaming, with two way streaming being used when the duplex factor is greater than 1, and otherwise one way streaming being used. A multiserver factor is derived as the multistream throughput divided selectively by the throughput bandwidth or the duplex throughput bandwidth. A revised value for the number of messages on queue is derived as u^m/(1−u^m), where m is the multiserver factor. Whether there is prioritization within the network based on packet size is detected, and network prioritization based on type of service (selected from the set including interactive service, browser service, batch service, and real time service) is derived by calculating apparent bandwidth using highest priority packets, where the highest priority packets are those for the service with the best long minus best short packets; calculating utilization at highest priority from average long packets minus best short packets; calculating utilization of second highest priority from average second level packets minus best highest level packets, where total perceived minus highest priority utilization is the total second level packets; and repeating the calculating steps for all levels of service so that the value for apparent bandwidth for the connection as a whole and the value for current bandwidth utilized by each network traffic priority level is obtained. Users skilled in the art will recognize that network prioritization algorithms can be FIFO (first in, first out), or that some percentage of higher priority frames are handled and then high priority service is interrupted for temporary lower priority queue service. The following example illustrates how to account for the fact that prioritization is not necessarily all FIFO within priority. Suppose that, for every four frames of highest priority sent, that one frame of the second highest level is sent. Therefore an optional "priority service factor" is included for each level tested, as to how many of its frames are sent for every one of its successively lower priority traffic stream. This is then combined with the overall utilization number for all priorities to revise the estimate of utilization by priority level. For example, in a two priority network, with one low priority frame sent for every four high priority frames when there's a queue, if overall high priority utilization is high, then approx one fifth of that utilization would have been lower priority traffic that was allowed through, and high priority actual traffic is down adjusted and lower priority utilization is upward adjusted, each by approx 20%.

Further, in accordance with the method of the invention, network measurement and planning includes, responsive to probative testing on a live network and application of queuing theory to the results of the probative testing, deriving current propagation delay, latency, utilization by priority, bandwidth, hop count, duplex, and multiserver factors; and responsive to these factors determining average message length for all priorities, queuing theory input for all priorities, arrival rates, utilization, current window size, optimal window size, expected current average network response time, and utilization at which a response time requirement is not met. Network performance may be further evaluated responsive to a case selected from the set of cases including a change of location of servers or users; a change in utilization by priority; a change in utilization by user traffic pattern; a change in device latencies; and a change in bandwidth.

Network managers and planners are interested in current performance of the network with respect to service level targets and in "what-if" planning scenarios. Four routines follow to describe how the probative testing results and the application of the above queueing theory concepts and formulas apply to service level attainment and what-if planning scenarios.

ROUTINE 1—NETWORK SERVICE LEVEL ATTAINMENT

This routine measures current network performance against a service level target for response time at the network (and not application) level. This will help network managers determine and prove whether or not there's a network problem when users experience poor response time.

It works as follows:
1. User inputs total round-trip number of characters for a transaction. Example: 80 characters in, 860 characters out=940 characters
2. User inputs network service level attainment agreement numbers (acceptable number of seconds or milliseconds for, for example, the 50th and 90th percentile cases. Example: 50 percent within 0.050 seconds, 90 percent within 0.150 seconds.
3. Use apparent bandwidth value for the calculation (total number of characters*8)/apparent bandwidth="service time" for transaction.
4. From the series of ANSA pings, calculate the following: [(5th best long ms−best long ms)+(5th best short ms best short ms)]/2=50th percentile queue time, and [(9th best long ms−best long ms)+(9th best short ms−best short ms)]/2=90th percentile queue time.
5. Calculate the total network latency "L" (this has already been derived by): [(best long ms+best short ms)/2]−[(long # characters+short# characters)*8]/appbw=L (where L is total net latency, that is, propagation delay plus device latency; and appbw is an abbreviation for 'apparent bandwidth').
6. The results from steps 3, 4, and 5 are combined to derive the 50th percentile and 90th percentile response times as follows:
   50th percentile queue time+modem time for transaction+ L=50th percentile network response time, and
   90th percentile queue time+modem time for transaction+ L=90th percentile network response time.
7. A best network time (i.e., 0% queue) is then calculated for the transaction: best network time=modem time for transaction+L.

2ND ROUTINE—EFFECT ON NETWORK PERFORMANCE OF MOVING USERS OR SERVERS

This routine answers the question what if there is a datacenter move or what if users are moved? What is the effect on response time? This question is a propagation delay (distance) issue, and is solved by use of propagation delay, which equals one way distance*2*NQF, where NQF is the network quality factor (default=2, and expected range is 1.4 to 2.5).

The calculations for the movement of users or servers are as follows:
1. User inputs current 1 way distance between users and servers and the proposed new distance between them.
2. User inputs current NQF and expected future NQF for after the move.
3. Old propagation delay (old distance*2*old NQF/186000).
4. New propagation delay (new distance*2*new NQF/ 186000).
5. New propagation delay−old propagation delay=change in response time resulting from the move.

(Note, this does not affect queuing, however, it does affect window size calculations).

ROUTINE 3—CHANGE IN BANDWIDTH

Another what-if question involves changes to the network's bandwidth, and answers the question, if bandwidth changes, what will the effect be on response time? The network's apparent bandwidth and current utilized bandwidth (in bits per second) have been previously calculated and stored.
1. User inputs the new bandwidth in bits per second and keys in the round trip message size.
2. Calculate new % utilization=(current utilized bps/new bandwidth)*100.
3. Current utilization bps/new bandwidth bps=U (where "U" is the utilization factor)
4. U/(1−U)=Q (i.e., the new queue factor).
5. Average message size*8*Q=average # bits on queue.
6. Average # bits on queue/new bandwidth=average queue delay ms.
7. Old average delay=old q factor x average message size*8
8. New average delay−old average delay=change in mean response time.

Optionally, the user may apply a multiserver factor to the formula of step 4 above, if it is known.

ROUTINE 4—CHANGE IN UTILIZATION

This routine answers the question, what is effect of change in utilization on response time?
1. User puts in a positive or negative percent change in utilization (e.g. +10% or −8%), and an average round trip message size in number of characters.
2. Current utilization %+change in utilization %=U (where U is the new utilization %).
3. U/(1−U)=new queue factor. (Use multiserver factor, if applicable).
4. New queue factor*average message size*8/appbw new queue delay.
5. New queue delay−old queue delay=change in response time.
6. Add this to the modem time plus latency to get the new average response time.

Advantages Over the Prior Art

The advantages of the system and method of the preferred embodiment of this invention include providing an improved system and method for network measurement and planning.

The advantages of the system and method of the preferred embodiment of this invention include, for dealing with apparent bandwidth, a key concept for understanding the network's "response time" characteristics, providing an improved system and method for using "pings" of different sizes to deduce aspects of network performance including: determining network end-to-end bandwidth; determining network end-to-end queue delay; determining network end-to-end propagation delay; and determining network internal packet size.

The advantages of the system and method of the preferred embodiment of this invention include providing a system and method for: improving end-to-end bandwidth analysis; expanding the concept of a queue delay to one of a queue depth; and analyzing the unitary concept of end-to-end "propagation delay" as including two components; that is, (i) the end-to-end device latencies, plus (ii) the end-to-end (speed of light factored) propagation delay.

The advantages of the system and method of the preferred embodiment of this invention include providing a comprehensive end-to-end queuing theory system and method for network analysis.

The advantages of the system and method of the preferred embodiment of this invention include providing a system and method for distinguishing between and determining network response time and network throughput.

The advantages of the system and method of the preferred embodiment of this invention include providing a system and method for near-instantaneous network evaluations that analyze the current state of the network and allow for "what if" scenarios involving all performance components for network planning, including: determining end-to-end network utilization; determining average message size in the network (this is not to be confused with "network internal packet size", which is a measure of the minimum network device buffer size, not network user message sizes); determining end-to-end network device latencies; determining end-to-end network propagation delay (a function of distance and speed of light); determining network response times for messages of any specified length under a null network load ("estimated optimal network service level"); determining network response times for messages of any specified length under the current network load ("estimated current service level"); estimating network utilization level at which (a user-input) service level compliance is compromised; determining network "duplex", "hop count," and "throughput" factors (three new end-to-end measurement concepts for network analysis and capacity planning); determining optimal maximum network window size, based on user message size, assuming no competing traffic; estimating expected current window size for a given message size at current network utilization; estimating change in response time and optimal window size if servers and/or users are relocated (e.g., datacenter consolidation or move); estimating change in response time and optimal window size if apparent network bandwidth is changed; and estimating unidirectional and bidirectional file transfer throughput capacities and window sizes under null, current, or other network load conditions.

It is a further advantage of the invention that there is provided system and method for evaluating key network performance parameters of concern to the managers, support personnel, and planners responsible for data communication and data, voice, and video communications networks.

It is a further advantage of the invention that there is provided a system and method for performing rigorous, real-time, queuing theory-based network analysis without need for knowledge of the components, topology or usage characteristics of the network.

It is a further advantage of the invention that there is provided a flexible, portable, easy to use network analysis method and system which works on a live network, provides instantaneous analysis of the current condition of the network, provides the capability to establish an historical database, and provides 'what if' analysis for future network changes.

It is a further advantage of the invention that there is provided a system and method for testing for the presence of network prioritization support and, if present, measuring network utilization and performance by means of discrete pings set at varying priorities.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Further, each step of the method may be executed on any general computer system, such as an IBM System 390, AS/400, PC or the like and pursuant to one or more, or a part of one or more, program modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A program storage device readable by a machine, tangibly embodying a program of instructions executable by a machine to perform a method for network measurement and planning, said method comprising:

sending probative test packets across a live communications network to derive network evaluation parameters including apparent bandwidth and current available bandwidth;

determining capacity, utilization and performance of said network as a function of said network evaluation parameters and of queue delay selectively determined with respect to single or multiple links apparent queue factor;

measuring responsive time including response time components of serialization or deserialization time, device latency, propagation delay and queue delay;

determining apparent bandwidth as a difference between short ping time and long ping time for discrete pings;

determining for a given message length serialization or deserialization time as a function of apparent bandwidth;

determining device latency as a function of ping times;

determining propagation delay as a function of network quality factor;

distinguishing between device latency and propagation delay latency as a function of said network quality factor; and determining queue delay.

2. The program storage device of claim 1 wherein traffic on said network includes one or more of voice and video traffic, client server transaction traffic, web browser traffic, and batch file, print and fax traffic.

3. The program storage device of claim 1, said determining queue delay including measuring the queue as a number of messages on said queue as a function of network utilization level and size of said messages as average network message length.

4. The program storage device of claim 3, said method further comprising:
using probative testing to determine the state of said network as an end-to-end entity; and
deriving the number of messages on queue and in service as u/(1−u), where u is said network utilization level.

5. The program storage device of claim 4, said method further comprising:
deriving the multiserver value as u^n/(1−u^n), where n is the number of servers in the path through said network.

6. The program storage device of claim 5, said method further comprising:
deriving the throughput characteristics of said network, including the network throughput bandwidth.

7. The program storage device of claim 6, said network throughput bandwidth being determined by streaming pings one way with discard.

8. The program storage device of claim 7, said method further comprising:
deriving a hop count factor as said network throughput bandwidth divided by apparent bandwidth for relating said respond time bandwidth of the network to said network throughput bandwidth.

9. The program storage device of claim 8, said method further comprising performing two way streaming to test for two way throughput bandwidth.

10. The program storage device of claim 9, said method further comprising:
dividing said two way throughput bandwidth by said network throughput bandwidth to derive the duplex factor for said network; and
deriving true queue depth as said network throughput bandwidth times network queue time divided by 8.

11. The program storage device of claim 10, said method further comprising:
deriving multistream throughput selectively responsive to one way streaming or two way streaming, with two way streaming used when said duplex factor is greater than 1, and otherwise with one way streaming.

12. The program storage device of claim 11, said method further comprising:
deriving a multiserver factor as said multistream throughput divided selectively by said throughput bandwidth or said duplex throughput bandwidth.

13. The program storage device of claim 12, said method further comprising:
deriving a revised value for the number of messages on queue as u^m/(1−u^m), where m is said multiserver factor.

14. The program storage device of claim 1, said method further comprising detecting for prioritization within said network based on packet size.

15. A program storage device readable by a machine, tangibly embodying a program of instructions executable by a machine to perform a method for network measurement and planning, said method comprising:
sending probative test packets across a live communications network to derive network evaluation parameters including apparent bandwidth and current available bandwidth;
determining capacity, utilization and performance of said network as a function of said network evaluation parameters and of queue delay selectively determined with respect to single or multiple links apparent queue factor;
testing for network prioritization based on type of service selected from a set including interactive service, browser service, batch service, and real time service; including
calculating apparent bandwidth using highest priority packets, where said highest priority packets are those for the service with best long minus best short packets;
calculating utilization at highest priority from average long packets minus best short packets;
calculating utilization of second highest priority from average second level packets minus best highest level packets, where total perceived minus highest priority utilization is said total second level packets; and
repeating said calculating steps for all levels of service.

16. A method for network measurement and planning, comprising the steps of:
responsive to probative testing on a live network and selective calculation and application of single and multiple links apparent queue factor to the results of said probative testing, deriving current propagation delay, latency, utilization by priority, bandwidth, hop count, duplex, and multiserver factors; and responsive thereto
determining average message length for all priorities, arrival rates, utilization, current window size, optimal window size, expected current average network response time, and utilization at which a response time requirement is not met.

17. The method of claim 16, comprising the further step of evaluating network performance responsive to a case selected from a set of cases including a change of location of servers or users; a change in utilization by priority; a change in utilization by user traffic pattern; a change in device latencies; and a change in bandwidth.

18. A method for evaluating a communications network interconnecting a workstation and a target station, comprising the steps of:
communicating long ping bits;
communicating short ping bits;
determining the best long ping time;
determining the best short ping time; and
calculating apparent bandwidth as a function of the number of long ping bits, the number of short ping bits, said best long ping time, and said best short ping time.

19. The method of claim 18, further comprising the steps of:
determining average long ping time;
determining average short ping time; and
calculating the current available bandwidth as a function of said number of long ping bits, said number of short ping bits), said average long ping time, and said average short ping time.

20. The method of claim 19, further comprising the step of:
calculating the current unavailable bandwidth as equal to said apparent bandwidth minus said current available bandwidth.

21. The method of claim 20, further comprising the step of:
calculating apparent utilization of said network as said current unavailable bandwidth divided by said apparent bandwidth.

22. The method of claim 18, further comprising the step of:
calculating apparent latency selectively as a function of said best short ping time, said short ping bits, and said apparent bandwidth or as a function of said best long ping time or as a function of averaged combination of said best long ping time and said best short ping time.

23. The method of claim 22, further comprising the step of:
calculating average queue time selectively as a function of said average short ping time and said best short ping time, or as a function of said long ping time, or as a function of an averaged combination of said long ping time and said short ping time.

24. The method of claim 23, further comprising the step of:
calculating apparent two way queue depth as a function of said apparent bandwidth and apparent queue depth.

25. The method of claim 21, further comprising the step of:
calculating apparent queue factor as a function of said apparent utilization.

26. The method of claim 25, further comprising the steps of:
adjusting the value of said apparent bandwidth to the value of an FTP or streamed ping, or multistream version of said FTP or streamed ping; and
calculating apparent queue factor as a function of said utilization and a multiserver factor, said multiserver factor representing the ratio of said multistream FTP to said single FTP.

27. The method of claim 26, further comprising the step of:
calculating apparent average network message length as a function of said apparent queue depth and said apparent queue factor.

28. The method of claim 27, further comprising the steps of:
determining the acknowledgment message length;
calculating apparent maximum user window size as a function of said average user message length, said acknowledgment message length, said apparent bandwidth, and said apparent latency.

29. The method of claim 28, further comprising the step of:
calculating estimated current user window size as a function of said average user message length, said acknowledgment message length, said current available bandwidth, and said apparent latency.

30. The method of claim 29, further comprising the steps of:
determining the standard deviation of said short ping times;
determining the standard deviation of said long ping times; and
calculating apparent jitter as a function of said standard deviations of said short pint times and said long ping times.

31. The method of claim 30, further comprising the steps of:
establishing a network quality factor;
determining distance between said work station and said target station; and
calculating estimated path propagation delay as a function of said network quality factor and said distance.

32. The method of claim 31, comprising the further step of:
calculating apparent device latency as a function of said apparent latency and said estimated path propagation delay.

33. The method of claim 31, comprising the further step of:
calculating estimated optimal network service level as a function of said user message length, said apparent bandwidth, and said apparent latency.

34. The method of claim 33, comprising the further step of:
calculating estimated current network service level as a function of said user message length, said apparent bandwidth, said average queue time, and said apparent latency.

35. The method of claim 34, comprising the further step of:
calculating estimated optimal network service level as a function of said network latency, said message size, and said apparent bandwidth.

36. The method of claim 35, comprising the further steps of:
establishing a target value;
if said estimated optimal network service level is greater than said target value, flagging the service level as unattainable;
if said estimated optimal network service level is less than or equal to said target value, then calculating the maximum allowable average queue time as a function of said estimated optimal network service level and said target value.

37. The method of claim 36, further comprising the step of:
calculating the network queues size as a function of said apparent bandwidth and said maximum allowable average queue time.

38. The method of claim 37, further comprising the step of:
calculating the network queue factor at which response time equals said target as a function of said network queues size and said average network message size.

39. The method of claim 38, further comprising the steps of:
determining the multiserver factor;
calculating the utilization level at which said response time equals said target as a function of said network queues size, said average network message size, and said multiserver factor.

40. Method for evaluating a communications network, comprising the steps of:
probative testing a live communications network by selectively sending and receiving a plurality of network evaluation signals through said network;
calculating and applying single and multiple links apparent queue factor to said network evaluation signals, for deriving network evaluation parameters including apparent bandwidth and current available bandwidth, current propagation delay, latency, utilization by priority, hop count, duplex, and multiserver factors;
responsive to selected said network evaluation parameters, analyzing average message length for all priorities, arrival rates, utilization, current window size, optimal window size, expected current average network response time, and utilization at which a response time requirement is not met; and responsive to selected said network evaluation parameters, analyzing the throughput of said network.

41. A method for evaluating a communications network, comprising the steps of:
- selectively sending and receiving a plurality of network evaluation signals through said network, said network evaluation signals being selected from the set of signals including discrete one-way echoed packets, discrete echoed packets, streamed one-way packets, streamed echoed packets, multistreamed one-way packets, multistreamed echoed packets, uni-directional file transfers, bi-directional file transfers, and multi-streamed file transfers;
- responsive to said network evaluation signals, selectively recording network evaluation parameters selected from the set of parameters including number of packets sent, number of packets received, packet send time stamp, packet receipt time stamp, packet size, packet one-way trip time, packet round trip time, standard deviation, and bytes transferred per unit of time;
- responsive to selected said network evaluation parameters, analyzing the response time of said network, including determining at least one of factors defining the apparent bandwidth, current available bandwidth, current unavailable bandwidth, apparent utilization, apparent average message size, apparent maximum user window size, estimated current user window size, apparent jitter, estimated path propagation delay, estimated optimal network service level, estimated current network service level, estimated network utilization level at which service level compliance is compromised, average queue time, apparent queue depth, apparent queue factor, and apparent device latency of said network;
- responsive to selected said network evaluation parameters, analyzing the throughput of said network, including determining the hop count factor, duplex factor, throughput factor, and multi-server factor of said network;
- responsive to user selection, executing one or more service level and capacity planning routines selected from the set including routines for planning network characteristics, calculating the change in network traffic before network response time level is compromised, calculating the additional file load capacity of said network, and for determining window size for file transfer to fill remaining capacity; and
- further responsive to user selection, selectively executing optimized ping, ping extensions, transaction, file echo, bursts, multistreaming, and unidirectional transmission and recording routines.

42. A system for evaluating a communications network, comprising:
- means for probative testing a live communications network by selectively sending and receiving a plurality of network evaluation signals through said network;
- means for calculating and applying single and multiple links apparent queue factor to said network evaluation signals for selectively deriving and recording network evaluation parameters including apparent bandwidth and current available bandwidth, current propagation delay, latency, utilization by priority, hop count, duplex, and multiserver factors;
- means responsive to selected said network evaluation parameters for analyzing average message length for all priorities, arrival rates, utilization, current window size, optimal window size, expected current average network response time, and utilization at which a response time requirement is not met; and
- means responsive to selected said network evaluation parameters for analyzing the throughput of said network.

43. A program storage device readable by a machine, tangibly embodying a program of instructions executable by a machine to perform method steps for evaluating a communications network, said method steps comprising:
- probative testing a live communications network by selectively sending and receiving a plurality of network evaluation signals through said network;
- calculating and applying single and multiple links apparent queue factor to said network evaluation signals, for deriving network evaluation parameters including apparent bandwidth and current available bandwidth, current propagation delay, latency, utilization by priority, hop count, duplex, and multiserver factors;
- responsive to selected said network evaluation parameters, analyzing average message length for all priorities, arrival rates, utilization, current window size, optimal window size, expected current average network response time, and utilization at which a response time requirement is not met; and
- responsive to selected said network evaluation parameters, analyzing the throughput of said network.

44. An article of manufacture comprising: a computer useable medium having computer readable program code means embodied therein for evaluating a communications network, the computer readable program means in said article of manufacture comprising:
- computer readable program code means for causing a computer to effect probative testing a live communications network by selectively sending and receiving a plurality of network evaluation signals through said network;
- computer readable program code means for causing a computer to effect calculating and applying single and multiple links apparent queue factor to said network evaluation signals for selectively deriving and recording network evaluation parameters including apparent bandwidth and current available bandwidth, current propagation delay, latency, utilization by priority, hop count, duplex, and multiserver factors;
- computer readable program code means for causing a computer to effect responsive to selected said network evaluation parameters analyzing average message length for all priorities, arrival rates, utilization, current window size, optimal window size, expected current average network response time, and utilization at which a response time requirement is not met; and
- computer readable program code means for causing a computer to effect responsive to selected said network evaluation parameters analyzing the throughput of said network.

* * * * *